United States Patent
Schober et al.

(10) Patent No.: US 10,060,832 B2
(45) Date of Patent: Aug. 28, 2018

(54) SENSOR DEVICE FOR TIRE INSPECTION

(71) Applicants: Compagnie Generale des Etablissements Michelin, Clermont-Ferrand (FR); Michelin Recherche et Technique S.A., Granges-Paccot (CH)

(72) Inventors: Bradley D. Schober, Greer, SC (US); Frank E. Gramling, Greenville, SC (US); David A. Judd, Mauldin, SC (US)

(73) Assignee: Compagnie Generale Des Etablissements Michelin, Clermont-Ferrand (FR)

(*) Notice: Subject to any disclaimer, the term of this patent is extended or adjusted under 35 U.S.C. 154(b) by 114 days.

(21) Appl. No.: 15/112,731

(22) PCT Filed: Mar. 13, 2014

(86) PCT No.: PCT/US2014/026097
§ 371 (c)(1),
(2) Date: Jul. 20, 2016

(87) PCT Pub. No.: WO2015/137953
PCT Pub. Date: Sep. 17, 2015

(65) Prior Publication Data
US 2016/0377507 A1    Dec. 29, 2016

(51) Int. Cl.
*G01M 17/02* (2006.01)
*B60C 25/00* (2006.01)
*B60C 25/05* (2006.01)

(52) U.S. Cl.
CPC .......... *G01M 17/02* (2013.01); *B60C 25/005* (2013.01); *B60C 25/0548* (2013.01)

(58) Field of Classification Search
None
See application file for complete search history.

(56) References Cited

U.S. PATENT DOCUMENTS

| | | | | |
|---|---|---|---|---|
| 4,936,138 A | * | 6/1990 | Cushman | G01M 17/025 73/146 |
| 6,255,940 B1 | * | 7/2001 | Phelan | B60C 23/0433 152/152.1 |
| 6,550,320 B1 | | 4/2003 | Giustino | |
| 6,832,513 B2 | * | 12/2004 | Weiss | G01M 17/02 73/146 |

(Continued)

FOREIGN PATENT DOCUMENTS

EP    2085253 A1    8/2009
WO    WO 2006/067361 A1    6/2006

OTHER PUBLICATIONS

International Search Report for PCT/US2014/026021, dated Jun. 20, 2014, 7 pages.

(Continued)

*Primary Examiner* — Jill Culler
(74) *Attorney, Agent, or Firm* — Dority & Manning, P.A.

(57) ABSTRACT

A sensor device is provided for use in tire inspection. The sensor device is configured for removable placement along the inner surface of a tire. The sensor device has a profile that allows placement of one or more sensors in close proximity to the inner surface of the tire. The profile allows the sensor device to be used with a variety of tire sizes and shapes.

20 Claims, 5 Drawing Sheets

(56) References Cited

U.S. PATENT DOCUMENTS

| | | | |
|---|---|---|---|
| 6,907,777 B2* | 6/2005 | Weiss | G01M 17/02 |
| | | | 73/146 |
| 7,506,539 B2 | 3/2009 | Miyoshi et al. | |
| 7,762,129 B2 | 7/2010 | Niklas et al. | |
| 7,826,192 B2* | 11/2010 | Sinnett | G01M 17/022 |
| | | | 156/123 |
| 8,051,705 B2 | 11/2011 | Kobayakawa | |
| 8,526,128 B2 | 9/2013 | Kubota et al. | |
| 8,939,020 B2* | 1/2015 | Townsend | G01M 17/02 |
| | | | 73/146 |
| 2002/0134910 A1 | 9/2002 | Kokubu et al. | |
| 2009/0078347 A1 | 3/2009 | Niklas | |
| 2012/0038357 A1 | 2/2012 | Brandon et al. | |
| 2013/0162265 A1 | 6/2013 | Beccavin et al. | |

OTHER PUBLICATIONS

International Search Report for PCT/US2014/026097, dated Jun. 19, 2014, 8 pages.

European Search report for Application No. 14885755.7 dated Sep. 28, 2017 9 pgs.

European Search report for Application No. 14885120.7 dated Oct. 9, 2017 8 pgs.

* cited by examiner

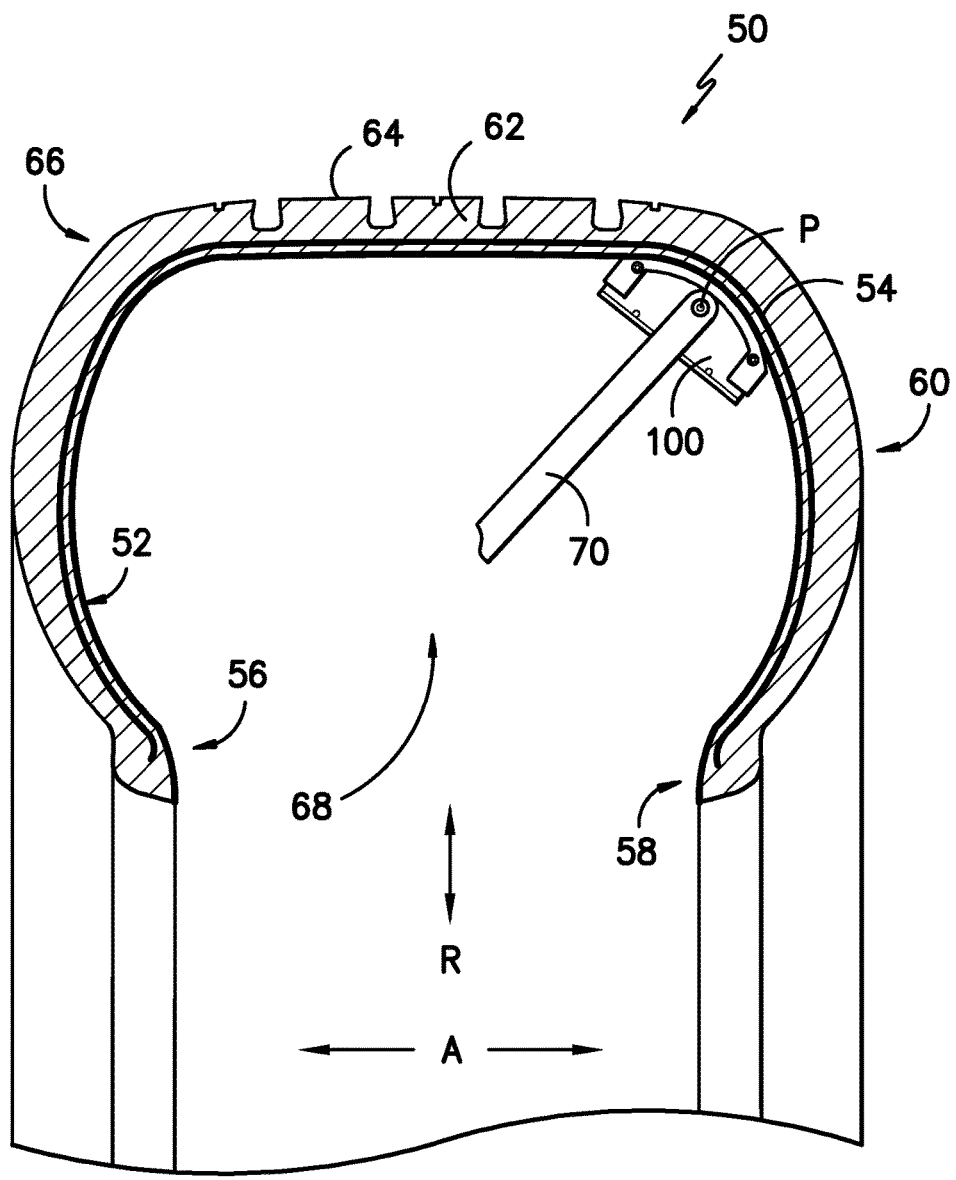
FIG. -1-

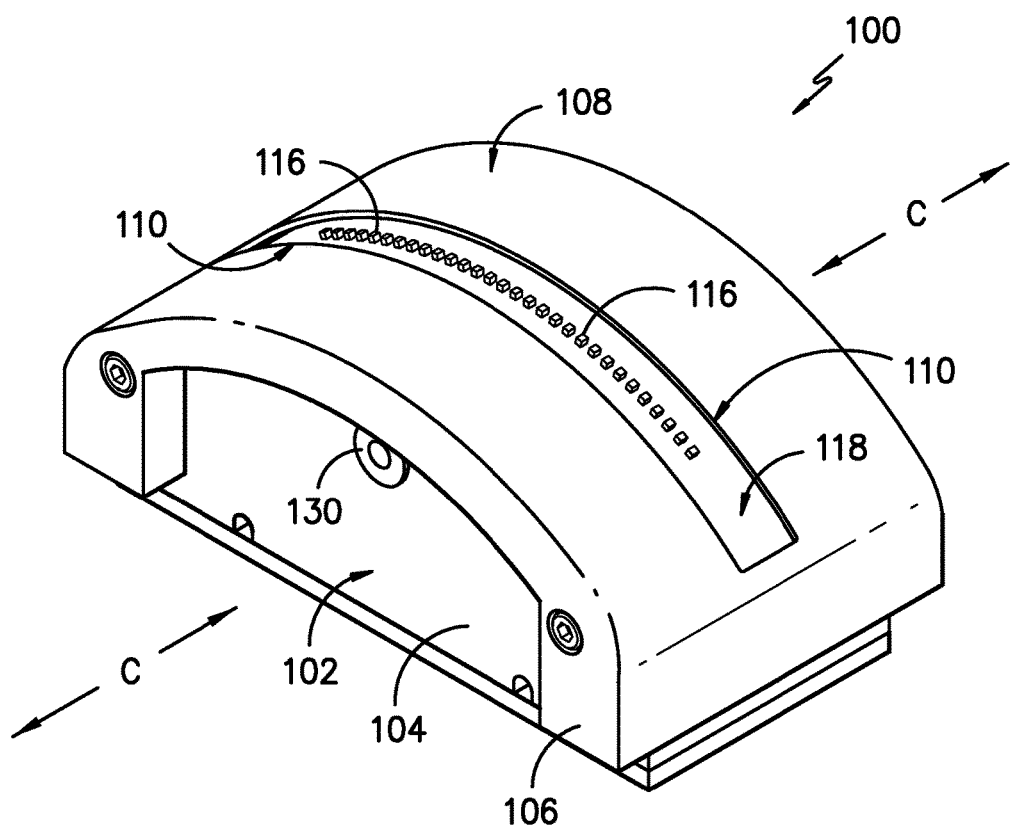
FIG. -2-

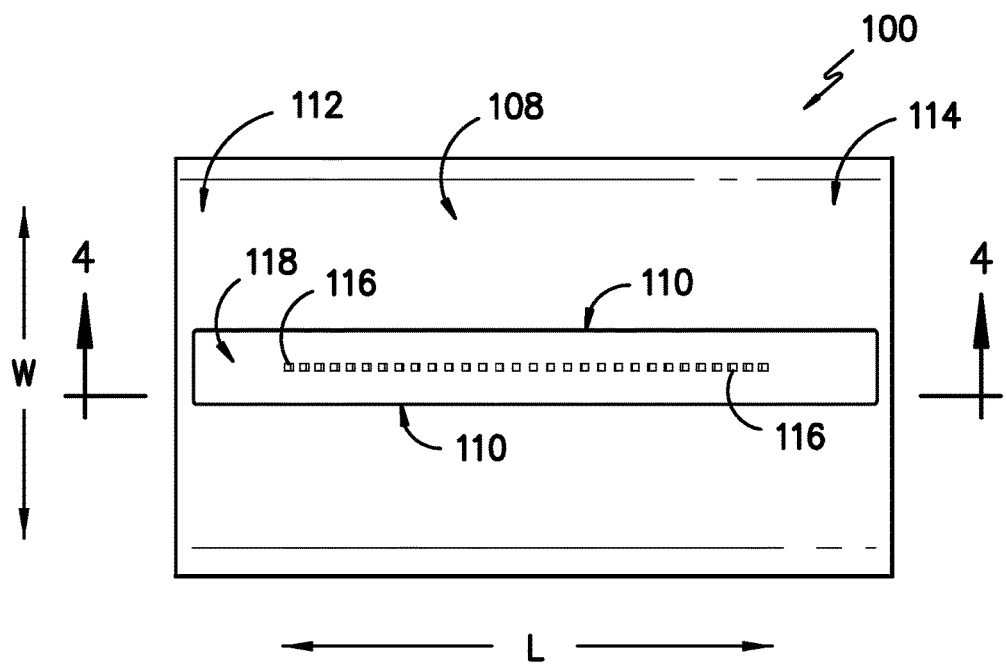
FIG. -3-
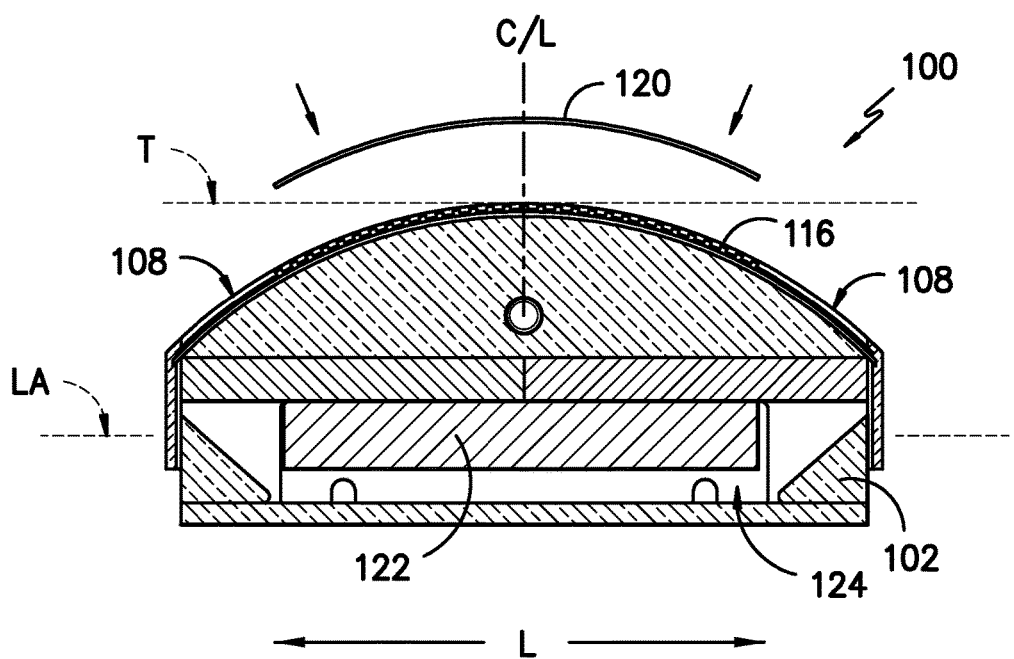
FIG. -4-

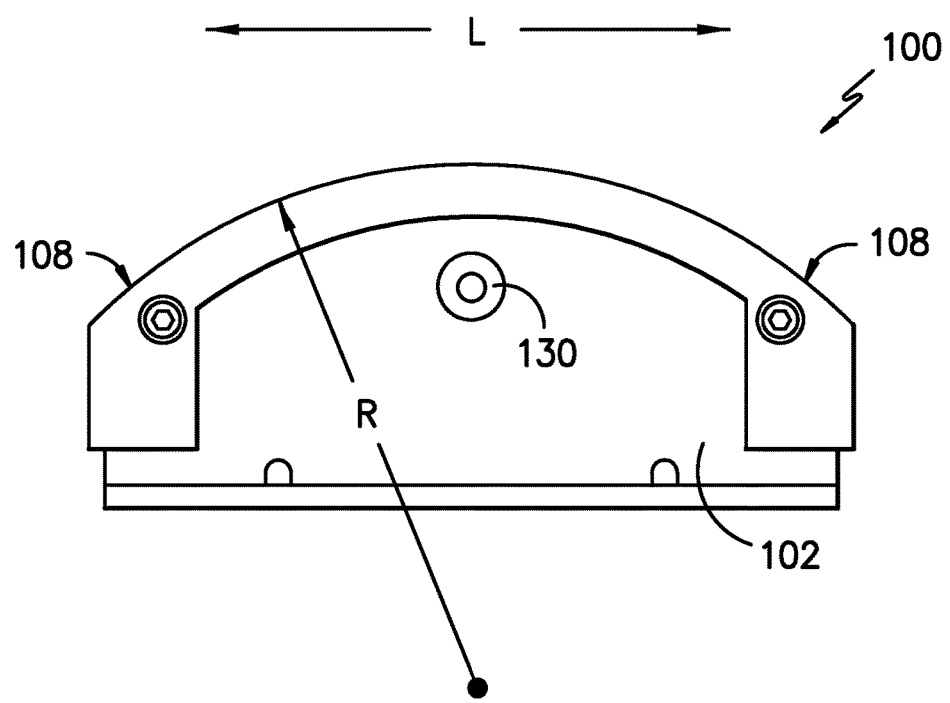
FIG. -5-

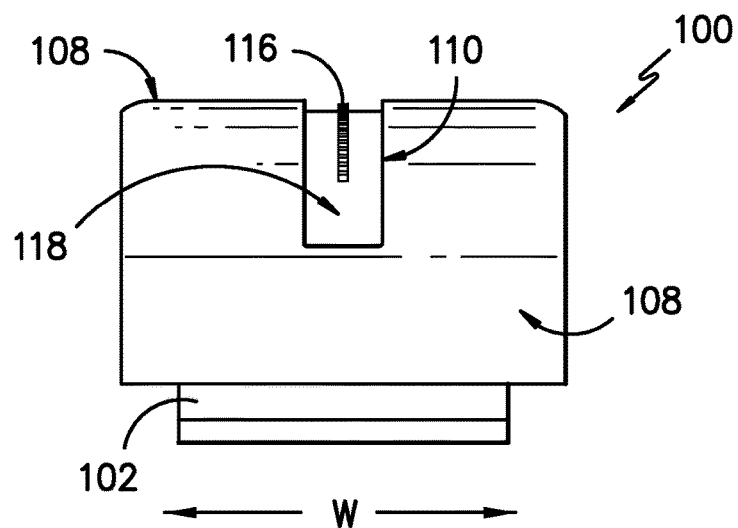
FIG. -6-
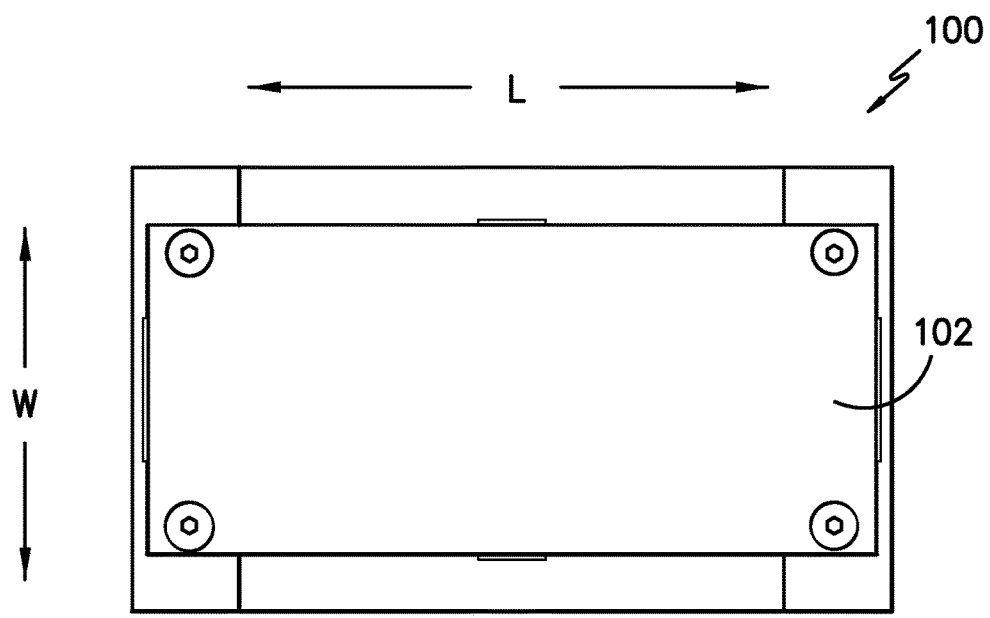
FIG. -7-

SENSOR DEVICE FOR TIRE INSPECTION

FIELD OF THE INVENTION

The subject matter of the present disclosure relates generally to a device for removably positioning one or more sensors along the inner surface of a tire.

BACKGROUND OF THE INVENTION

A known tire construction uses a body ply having reinforcement elements that extend from bead portion to bead portion through opposing sidewall portions, and a crown portion of the tire. Sometimes referred to as the carcass ply or reinforcing ply, the body ply is typically anchored at the beads and maintains the overall shape of the tire as the tire is inflated and used. The reinforcement elements of the body ply are usually oriented substantially along the radial direction (a direction perpendicular to the axis of rotation) and can include e.g., a ferrous metal.

During use of the tire, these reinforcement elements (sometimes referred to as cords) may be damaged e.g., from impact with objects in the roadway, travel over curbs, and other damaging events. In some situations, the reinforcement elements may be completely broken as a result of such an event. Unfortunately, this damage may not be readily discoverable from a visual inspection of the exterior of the tire because the reinforcement elements are contained within the rubber materials used to construct the tire.

Commercial tires are commonly reused after a process referred to as retreading. With retreading, worn tread is removed from the tire and a new tread belt or tread section is installed onto the tire. Replacement of the tread is less expensive than replacing the whole tire and allows additional mileage to be obtained using the same tire carcass. This practice is common particularly with commercial tires for heavy trucks.

Before replacing the tread, however, it is advantageous to inspect the tire, including the reinforcement elements of the body ply, for damage or wear. In certain situations, inspection may reveal that replacement of the tire is required rather than retreading. Alternatively, repair of the tire may be required. As stated above, not all damage to interior elements such as e.g., the reinforcement elements of the body ply are readily apparent from a visual inspection alone.

As the reinforcement elements for commercial tires such as heavy truck tires are frequently constructed from a ferrous material, one or more sensors can be used to detect discontinuities in the reinforcement elements such as e.g., breaks that are not otherwise ascertainable from a visual inspection of the tire. It is desirable to automate such an inspection process so that multiple tires may be inspected economically and expediently. However, tires come in a variety of shapes and sizes. More specifically, the profile, height, and width (along the axial direction) can vary substantially from tire to tire. For tire inspection, some sensors require placement at an inner surface of the tire either in contact with the tire or in close proximity thereto. This can be problematic with tire profile and size changes from tire to tire.

Additionally, the placement of certain sensors in the shoulder portion of the tire along the inner surface can be particularly challenging because the curvature at this portion of the tire and its variability between tires of different sizes and types. More particularly, challenges exist with accurately and consistently positioning one or more sensors at the inner surface of the tire, particularly at the shoulder region, over a range of tire profiles and widths so as to detect e.g., damage to the reinforcement elements of the body ply. In addition, it is preferable that the sensor or sensors are readily be removable for use in inspecting another tire.

Accordingly, a device that can be properly positioned along an inner surface of the tire to facilitate inspection of the tire would be useful. More particularly, a device that can be used to repeatedly place one or more sensors at the inner surface of various tires, including along the shoulder regions, for a wide range of tire profiles and widths would be beneficial. Such a device that can be used with a variety of different sensor types would also be useful.

SUMMARY OF THE INVENTION

The present invention provides a sensor device for use in tire inspection. The sensor device is configured for removable placement along the inner surface of a tire. The sensor device has a profile that allows placement of one or more sensors in close proximity to the inner surface of the tire. The profile allows the sensor device to be used with a variety of tire sizes and shapes. Additional objects and advantages of the invention will be set forth in part in the following description, or may be apparent from the description, or may be learned through practice of the invention.

In one exemplary embodiment, the present invention provides a sensor device that is removably postionable along an inner surface of a tire. The device includes a body having an outermost inspection surface for placing at the inner surface of the tire. The outermost inspection surface has a profile of an arc of a circle. The arc of a circle is defined by a radius of curvature that is orthogonal to a circumferential direction of the tire when positioned along the inner surface. The radius of curvature is in the range of 50 mm to 75 mm. An aperture is defined by the outermost inspection surface of the body. At least one sensor is located at the aperture of the body.

In another exemplary embodiment, the present invention provides a sensor device that is removably postionable along an inner surface of a tire. The device includes a body having an outermost inspection surface for placing at the inner surface of the tire. The body defines a longitudinal direction and a width direction. The body has an outermost inspection surface for placing at the inner surface of the tire. The body defines a longitudinal direction and a width direction. The outermost inspection surface has a substantially flat profile along the width direction. Along the longitudinal direction, the outermost inspection surface has a profile of an arc of a circle, wherein the arc is defined by a radius of curvature in the range of 50 mm to 75 mm and is orthogonal to the width direction. An aperture is defined by the outermost inspection surface. At least one sensor is located at the aperture of the body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a cross-sectional view of a portion of an exemplary tire as well as a side view of an exemplary embodiment of the present invention.

FIG. 2 illustrates a perspective view of an exemplary embodiment of the present invention.

FIG. 3 provides a top view of the exemplary embodiment of FIG. 2.

FIG. 4 is a cross-sectional view along lines 4-4 of the exemplary embodiment in FIG. 3.

FIG. 5 is a side view of the exemplary embodiment of FIG. 2.

FIG. 6 is an end view of the exemplary embodiment of FIG. 2.

FIG. 7 is a bottom view of the exemplary embodiment of FIG. 2.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As used herein, the following definitions apply:

"Meridian plane" is a plane within which lies the axis of rotation of the tire. FIG. 1 is a cross-section of an exemplary tire 50 taken along a meridian plane.

The "crown portion" of the tire is the portion that extends along the axial direction A (which is the direction parallel to the axis of rotation of the tire) between the sidewall portions of the tire including the tread and components positioned radially inward of the tread.

"Body ply" or "carcass" or "carcass ply" is a ply that extends between and from the bead portions on opposing sides of the tire, through the opposing sidewall portions, and across the crown portion of the tire. The body ply may include ferrous reinforcements.

The "radial direction" is perpendicular to the axis of rotation of the tire and is denoted in the figures with an "R" and a directional arrow. The axial direction, parallel to the axis of rotation, is denoted in the figures with an "A" and directional arrows.

The "circumferential direction" of the tire (also referred to as the longitudinal direction) is the direction corresponding to the periphery of the tire and is defined by the direction of rotation of the tire during normal operation. The circumferential direction is denoted in the figures with a C and directional arrows.

FIG. 1 illustrates a cross-sectional view of an exemplary tire 50 along a meridian plane. A side view of an exemplary embodiment of a sensor device 100 of the present invention is removably positioned at an inner surface 52 of tire 50 for purposes of tire inspection. The construction of tire 50 includes a body ply 54 that extends from bead portions 56 and 58, through opposing sidewall portions 58 and 60, and through crown portion 62 with tread 64. Sensor device 100 is shown along a shoulder portion 66 of tire 100. Sensor device 100 is not limited to use along shoulder portion 66.

Instead, sensor device 100 can be readily placed at other locations along the inner surface 52 of tire 50. Certain embodiments of the sensor device of the present invention, as described herein, are particularly suited for use along the shoulder portion of a variety of tire sizes of different widths and profiles.

For this exemplary embodiment, sensor device 100 is removably positioned within the interior 68 of tire 50 along inner surface 52 by a positioning system that includes a support arm 70. Sensor device 100 is pivotally connected to support arm 70 at point P, which allows the orientation of device 100 to be adjusted to more readily match the profile of the inner surface 52 of tire 50. Support arm 70 can be connected at point of attachment 130 (FIG. 2) and is provided by way of example only. Other positioning systems may be used with sensor device 100 as well.

Sensor device 100 is useful for inspecting tire 50 particularly where it is desirable to position one or more sensors in close proximity to the inner surface 52 of tire 50. Body ply 54 includes reinforcement elements typically constructed from a ferrous material and embedded in the rubber materials used to construct tire 50. As previously stated, reinforcement elements can be damaged during use of tire 50. During a tire inspection process, as may be part of e.g., a retreading operation, tire 50 may be inspected for damage to such reinforcement elements. For example, sensor device 100 may include one or more Hall Effect sensors as will be further described herein for detecting breaks in ferrous reinforcement elements. While inspection of such will be used by way of example, using the teachings disclosed herein one of ordinary skill in the art will understand that sensor device 100 can be useful for other tire inspections using other sensor types where placement of the sensor(s) in close proximity to the inner surface of the tire is desired—and particularly where placement of one or more sensors along the shoulder region of tires of various sizes and profiles is desired. For example, sensor device 100 may include Hall Effect sensors, temperature sensors, optical sensors, and/or other type sensors as well.

During inspection, sensor device 100 may be placed very close (e.g., within 5 mm to 6 mm) of inner surface 52 or may contact surface 52 as shown in FIG. 1. Once positioned, tire 50 can be rotated about its axis of rotation so as to scan or detect for broken reinforcement elements over a complete circumference of the tire. Sensor device 100 allows the placement of one or more sensors in close proximity to inner surface 52, which may be necessary for proper testing and also expedites testing by allowing a complete inspection from a single rotation of tire 50.

As shown in FIG. 2, sensor device 100 includes a body 102 that may be constructed from e.g., an inner portion 104 and an outer portion 106. Body 102 includes an outermost inspection surface 108. As used herein, "outermost" means that the inspection surface 108 is the closest part of body 102 to that portion of the inner surface 52 of tire 50 that is being inspected.

Referring now to all figures, body 102 defines a longitudinal direction L and width direction W that is orthogonal to direction L. When body 102 is placed along the inner surface 52 of tire 50, body 102 is oriented such that the longitudinal direction L is orthogonal to the circumferential direction C of tire 50 (FIGS. 2 and 5). Body 102 includes an aperture 110 defined by outermost inspection surface 108. Aperture 110 extends longitudinally along direction L between a first end 112 and a second end 114 of outermost inspection surface 108 (FIGS. 3 and 7).

As best shown in FIGS. 2, 3, and 4, a plurality of sensors 116 are arranged side-by-side or adjacent to one another along longitudinal direction L and upon a sensor support surface 118 (which may e.g., a printed circuit board or other substrate) that is slightly recessed or positioned inwardly relative to outermost inspection surface 108. As shown, sensor support surface 118 is parallel to the outermost inspection surface 108. For this exemplary embodiment, sensors 116 are Hall Effect sensors 116, which detect magnetic flux and can provide a signal indicative of the presence of magnetic flux as well as the magnetic flux density. In one embodiment of the invention, thirty-two Hall Effect sensors are used. For detecting breaks in the reinforcements of body ply 54, the use of multiple Hall Effect sensors 116 improves the effectiveness of the sensor device 100 in detecting breaks. More particularly, the shoulder portion 66 of tire 50 is a high flexion zone for the tire and, therefore, a location where breaks in the reinforcements of body ply 54 are likely to be found. The use of multiple sensors ensures at least one sensor 116 will be located on each side of a break in shoulder portion 66 as tire 50 is rotated during the inspection process.

Referring now to FIGS. 1, 4, and 5, the outermost inspection surface 108 has a particular profile when viewed along the longitudinal-direction L as shown in these figures. More particularly, when sensor device 100 is placed against the inner surface of tire 50 (as in FIG. 1), the outermost inspection surface 108 has a profile of an arc of a circle. The arc of this circle has a radius R (FIG. 5) that is orthogonal to the circumferential direction C of tire 50 when sensor device 100 is position against inner surface 52 as shown in FIG. 1. The profile of outermost inspection surface 108 along its width (W) is substantially flat (FIG. 6).

The inventors have discovered that the profile for the outermost inspection surface 108 matches the shape of the inner surface of most tires along the shoulder zone when radius R is in the range of 50 mm to 75 mm. This allows sensor device 100 to be used over a wide variety of tire shapes and sizes. More particularly, the profile allows the placement of sensors 116 in close proximity to inner surface 52 so that tire 50 can be properly inspected by a single rotation of tire 50 past sensor device 100.

In one exemplary embodiment, the inventors have determined that when radius R is about 74 mm, the profile of the outermost inspection surface 108 will match the shape of the inner surface of approximately 85 percent of the heavy truck/commercial truck tire profiles that are commercially available. In another exemplary embodiment, the inventors have determined that when radius R is about 52 mm, the profile of the outermost inspection surface 108 will match the shape of the inner surface of the other approximately 14 percent of the heavy truck/commercial truck tire profiles that are commercially available.

As shown in FIG. 4, when sensors 116 are Hall Effect sensors, device 100 can be equipped with a permanent magnet 122 in order to create fields of magnetic flux used in detecting breaks in ferrous reinforcements. As shown, body 102 defines a compartment 124 into which magnet 122 is received. For this exemplary embodiment, magnet 122 is oriented with a longitudinal axis LA that is parallel to a line T that is tangent to outermost detection surface 108 at the centerline C/L of device 100. This orientation ensures a specific field of magnetic flux is created relative to the plurality of sensors 116.

As also shown in FIG. 4, sensor device 100 can be equipped with a protective cap 120 to protect sensors 116. Cap 120 is received into aperture 110 and covers sensors 116. As such, cap 120 can protect sensors 116 from damage during the inspection process where tire 50 is rotated past sensor device 100.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A sensor device that is removably postionable along an inner surface of a tire, the device comprising:
   a body comprising
      an outermost inspection surface for placing at the inner surface of the tire, the outermost inspection surface having a profile of an arc of a circle with a radius of curvature that is orthogonal to a circumferential direction of the tire when positioned along the inner surface, and wherein the radius of curvature is in the range of 50 mm to 75 mm;
      an aperture defined by the outermost inspection surface; and
      a plurality of sensors arranged adjacent to each other along the longitudinal direction of the body, the plurality of sensors located at the outermost inspection surface and within the aperture.

2. The sensor device of claim 1, wherein the radius of curvature is about 52 mm.

3. The sensor device of claim 1, wherein the radius of curvature is about 74 mm.

4. The sensor device of claim 1, wherein the body defines a longitudinal direction extending orthogonal to the circumferential direction of the tire when positioned along the inner surface, wherein the aperture extends longitudinally between a first end a second end of the outermost inspection surface.

5. The sensor device of claim 1, wherein the body defines a longitudinal direction and a width direction that is orthogonal to the longitudinal direction, and wherein the aperture has a profile along the width direction that is the same as the profile of the outermost inspection surface.

6. The sensor device of claim 5, wherein the plurality of sensors comprises Hall Effect sensors.

7. The sensor device of claim 6, further comprising a magnet received in a compartment defined by the body.

8. The sensor device of claim 7, wherein the magnet extends linearly along a direction that is parallel to a line tangent to a center of the arc of the circle defining the profile of the outermost inspection surface.

9. The sensor device of claim 5, wherein the plurality of sensors comprises temperature sensors.

10. The sensor device of claim 5, wherein the plurality of sensors comprises optical sensors.

11. The sensor device of claim 1, wherein the body defines a longitudinal direction extending orthogonal to the circumferential direction of the tire when positioned along the inner surface, wherein the aperture extends longitudinally between a first end a second end of the outermost inspection surface, wherein the plurality of sensors are positioned along a sensor support surface that is parallel to the outermost inspection surface.

12. The sensor device of claim 11, wherein the sensor support surface is positioned inwardly of the outermost inspection surface.

13. The sensor device of claim 11, further comprising a support arm to which the body is pivotally attached.

14. The sensor device of claim 1, further comprising a cap received at the aperture of the body inspection surface, positioned over the at least one sensor, and configured for protection of the at least one sensor during tire inspection.

15. The sensor device of claim 1, further comprising at least one mounting feature positioned on the body and configured for connection to a positioning system.

16. A sensor device that is removably postionable along an inner surface of a tire, the device comprising:
   a body comprising an outermost inspection surface for placing at the inner surface of the tire, the body defining a longitudinal direction and a width direction, the outermost inspection surface having a substantially flat profile along the width direction, the outermost inspection surface along the longitudinal direction having a profile of an arc of a circle, wherein the arc is defined by a radius of curvature in the range of 50 mm to 75 mm that is orthogonal to the width direction;
   an aperture defined by the outermost inspection surface; and
   a plurality of sensors arranged adjacent to each other along the longitudinal direction of the body located at the outermost inspection surface and within the aperture.

17. The sensor device of claim 16, wherein the radius of curvature is about 52 mm.

18. The sensor device of claim 16, wherein the radius of curvature is about 74 mm.

19. The sensor device of claim 16, wherein the plurality of sensors are located along a sensor support surface that is parallel to the outermost inspection surface.

20. The sensor device of claim 19, wherein the aperture has a profile along the width direction that is the same as the profile of the outermost inspection surface.

* * * * *